United States Patent [19]
Farnsworth

[11] 3,927,491
[45] Dec. 23, 1975

[54] PROCESS AND APPARATUS FOR GROWING PLANTS

[76] Inventor: Robert S. Farnsworth, 1200 Lakeshore, No. 15H, Oakland, Calif. 94606

[22] Filed: Dec. 30, 1974

[21] Appl. No.: 537,198

[52] U.S. Cl. .................................. 47/1.2; 47/34.13
[51] Int. Cl.² ........................................ A01G 31/02
[58] Field of Search ...................... 47/1, 1.2, 17, 39

[56] References Cited
UNITED STATES PATENTS

| | | | |
|---|---|---|---|
| 2,175,113 | 10/1939 | Fischer | 47/1.2 |
| 2,531,562 | 11/1950 | Eve | 47/34.13 |
| 3,230,967 | 1/1966 | Castro | 47/1 |
| 3,456,385 | 7/1969 | Plath | 47/1.2 |
| 3,579,907 | 5/1971 | Graves | 47/17 |
| 3,798,836 | 3/1974 | Rubens et al. | 47/1.2 |
| 3,830,013 | 8/1974 | Lesley | 47/1.2 |

FOREIGN PATENTS OR APPLICATIONS

| | | |
|---|---|---|
| 1,313,121 | 4/1973 | United Kingdom |
| 1,031,309 | 6/1966 | United Kingdom |
| 1,038,320 | 8/1966 | United Kingdom |
| 1,053,508 | 1/1967 | United Kingdom |
| 932,961 | 9/1973 | Canada |
| 3,093 | 1/1971 | Japan |

*Primary Examiner*—Robert E. Bagwill
*Attorney, Agent, or Firm*—Warren, Chickering & Grunewald

[57] ABSTRACT

A process for growing plants by means of water culture or hydroponics and apparatus therefor are disclosed. The process is particularly well suited for growing relatively bulky plants and includes floating the plants on a nutrient solution by rafts or the like. The rafts are positioned in close proximity to maximize the plant density per unit area of the solution and accordingly the space productivity of the process. As the plants grow on the rafts, the buoyancy of the rafts is increased and the rafts may be laterally displaced proportionally to plant growth to maintain high plant density per unit area of solution. Buoyancy of the rafts is preferably increased by a transrafting step in which a small raft is placed on a larger raft formed to receive the same. In another aspect of the present invention the nutrient solution is used as a transport medium, with the raft supported plants being urged across the nutrient solution as part of plant and/or raft processing steps.

11 Claims, 5 Drawing Figures

U.S. Patent  Dec. 23, 1975  Sheet 1 of 2  3,927,491
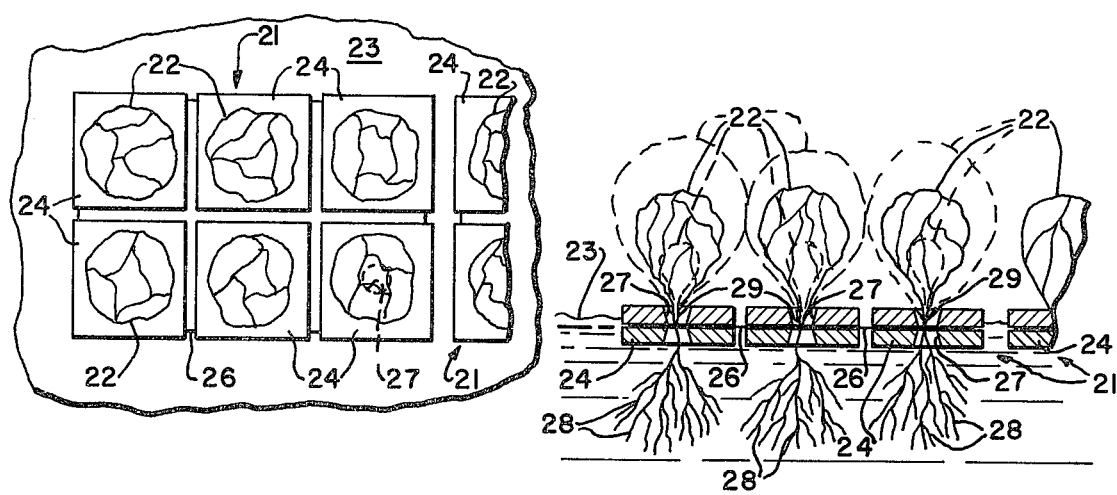
FIG.—2
FIG.—1
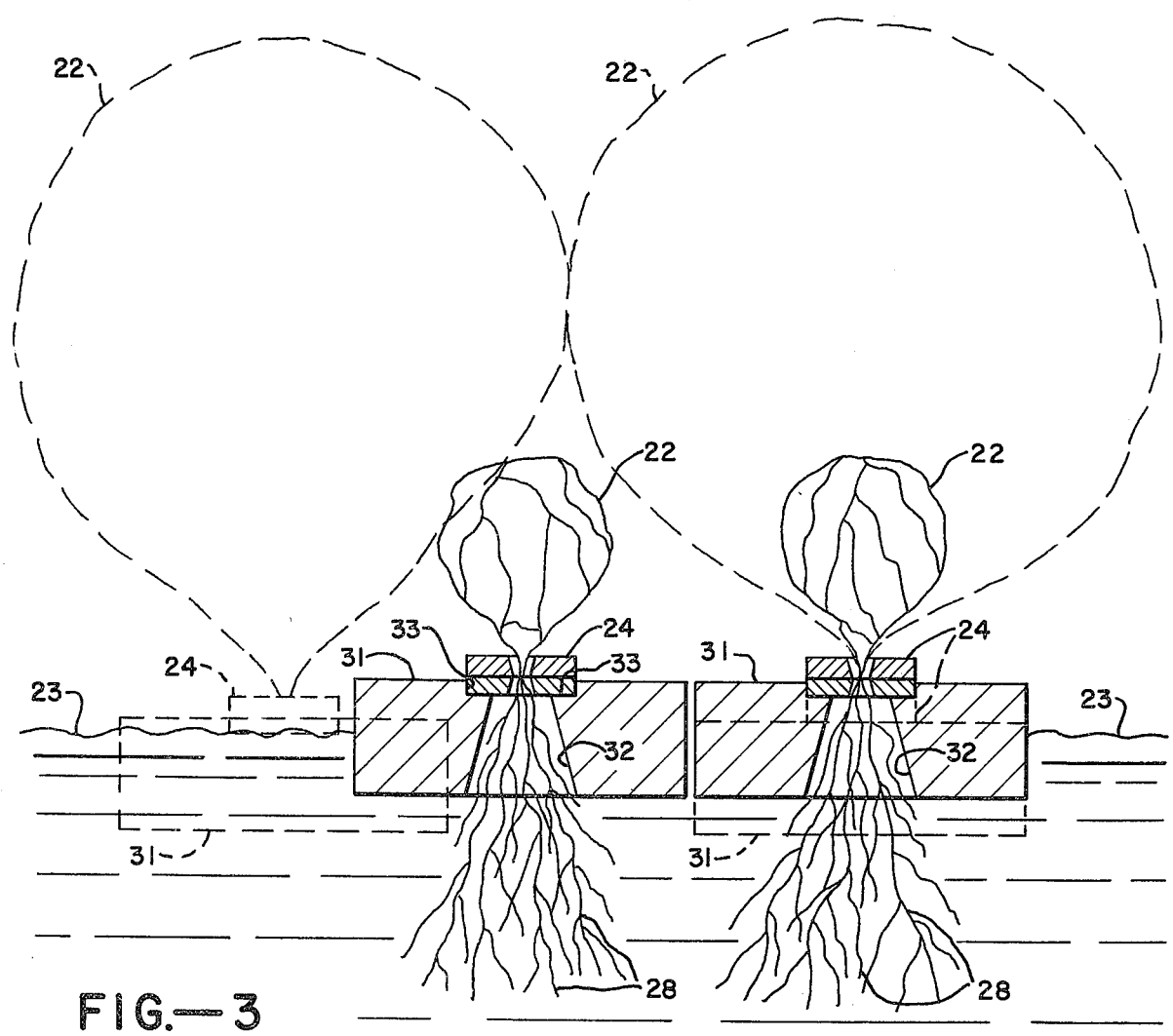
FIG.—3

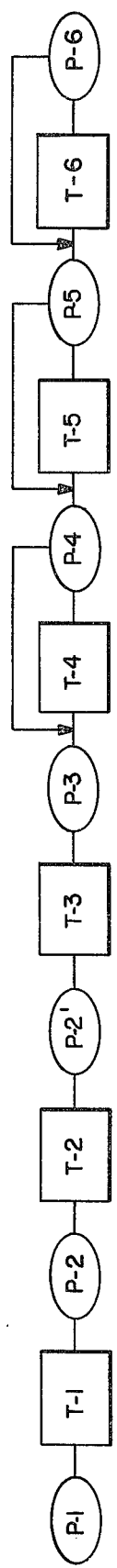
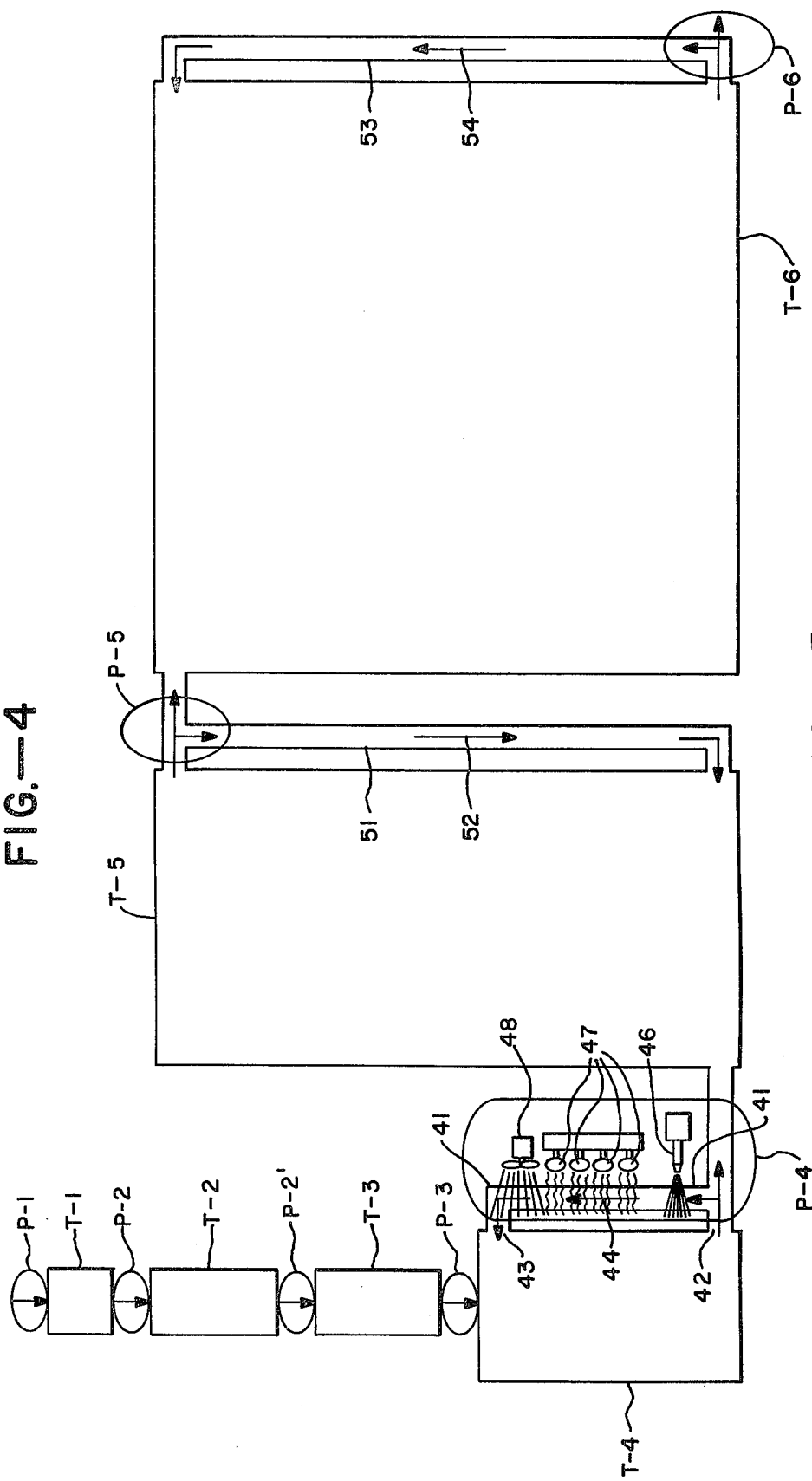
FIG.—4
FIG.—5

PROCESS AND APPARATUS FOR GROWING PLANTS

BACKGROUND OF THE INVENTION

Traditional plant farming procedures are based upon the concept of spatially fixed plants, which procedures concept commits a space of the farmland large enough for the mature plant for the full growing period of the plant. This is particularly exemplified by lettuce farming in which small seedlings are spaced apart by a distance sufficient to accommodate full growth of the lettuce plant. For plants such as lettuce, which require a substantial lateral area relative to the plant stem during mature plant stages and a relatively insubstantial lateral area during seedling stages, this commitment of space during the seedling stages and early growth stages results in a very substantial loss in the space productivity of the farmland.

The long term average yield for field grown lettuce is about 1120 cartons (24 heads) per hectare (450 cartons per acre). In recent years more intensive farming has brought the productivity of many fields up to about 1480 cartons per hectare (600 cartons per acre), which is a space productivity of ⅛ square meter per head (3 sq. ft. per head) harvested. Since in most areas there is about a 70 day summer growing period, the space productivity of even highly efficient fields is about 20 square meter days per head (210 sq. ft. days per head). Where climate permits, field grown lettuce can be double cropped with a total yield per year of about 2970 cartons per hectare (1200 cartons per acre).

The process of the present invention in which the plants are grown by means of water culture on a plurality of rafts allows the space productivity for plants such as lettuce to be increased seven fold over a 70 day growing cycle and 15 to 20 fold on an annual basis. The raft system is employed to provide plant mobility which enables an approximation of maximum plant density per unit area during all stages of plant growth. This maximization of plant density results in the substantial enhancement of space productivity.

The water culture or hydroponic growth of plants has been accomplished for more than 100 years and has been used commercially for flowers and tomatoes for approximately 20 years. The germination of seedlings for testing purposes on floating wafers or rafts has also been employed, for example, the seed germination system disclosed in U.S. Pat. No. 2,175,113. Such wafers have been employed solely for germination purposes, and they are not intended to support the plant through its full growth. Seedlings, therefore, must be transplanted, usually to a soil medium, for conventional farming, or to a granular medium for hydroponic farming. In both instances, the plants are spatially fixed which for some plants results in attendant limitations in space productivity.

Raft means have also been employed in connection with the growth of a single plant, such as an avocado, (U.S. Pat. No. 3,830,013) and the support of plant cuttings for the growth of roots (U.S. Pat. No. 3,456,385). These raft devices are directed primarily at the problem of accommodating changes in the water level of the solution on which the plants are supported. These rafts are not used to provide lateral spatial mobility for each plant with attendant space productivity enhancement. Additionally, U.S. Pat. No. 3,798,836 discloses the growth of green beans on a raft-like member formed from an open celled polyurethane foam. Again, this system does not employ the raft mobility in a lateral or horizontal direction, but merely uses the raft as a plant support in place of trays, granules or the like.

Accordingly, it is an object of the present invention to provide a process for growing plants by means of a raft system which couples material handling innovations with water culture technology to substantially enhance space productivity.

It is another object of the present invention to provide a process for growing plants which require a substantial lateral area relative to the plant stem for growth during mature stages and a relatively insubstantial lateral area during seedling plant stages in which the lateral spacing between plants is mimimized during all stages of growth so as to effect a cost reduction per plant.

Another object of the present invention is to provide a plant growing process in which plant mobility during growth stages and at harvest may be employed to enable the use of cost saving plant processing steps.

Still another object of the present invention is to provide a water culture process for growing plants in which the nutrient solution can function as a transport as well as growth medium.

Still a further object of the present invention is to provide a process for growing plants which will enable the annual production of a greater number of plants than by conventional techniques.

A further object of the present invention is to provide a process for growing plants in which transplanting steps evolving high labor costs are elimated.

Another object of the present invention is to provide an apparatus for growing plants by means of water culture which will enable production of the plants on a continuous processing basis employing material handling techniques.

It is a further object of the present invention to provide a process for growing plants which is simple and inexpensive to employ; enables a full utilization of plant by-products, such as roots and the like; and can be employed during the full year and in close proximity to the market area.

The process and apparatus for growing plants of the present invention has other objects and features of advantage which will be set forth in more detail and become apparent from the following description and the accompanying drawing.

SUMMARY OF THE INVENTION

The process of the present invention for growing plants which require a substantial lateral area relative to the plant stem during their growth is comprised, briefly, of floating the plants on a plurality of raft means with the raft means positioned in a nutrient solution in close proximity to each other for substantially maximum plant density per unit area of the nutrient solution, and laterally displacing the rafts to accommodate lateral plant growth while maintaining high plant density during all stages of growth. Usually the process further includes increasing the buoyancy of the raft means as the plants grow while maintaining the necessary stability of the raft means, and increasing the total effective area of the nutrient solution to correspond to growth while maintaining substantially maximum plant density. Increasing the buoyancy of the raft means is preferably accomplished by periodically placing the raft means on a larger auxiliarly raft means in a transrafting step. The process of the present invention further includes the steps of floating a plurality of plants by the raft means on a nutrient solution and urging the raft means over the nutrient solution from one processing station to another whereby the nutrient solution acts as a transport as well as growth medium.

DESCRIPTION OF THE DRAWING

FIG. 1 is a side elevational view, partially in crosssection, of raft means suitable for use in the process of the present invention.

FIG. 2 is a top plan view of the raft means of FIG. 1.

FIG. 3 is a side elevational view, in cross-section, showing the raft means of FIG. 1 placed upon auxiliary raft means.

FIG. 4 is a schematic diagram of a process in accordance with the present invention.

FIG. 5 is a schematic top plan view of water culture tank means constructed in accordance with the present invention and formed to carry out the process of FIG. 4.

DESCRIPTION OF THE PREFERRED EMBODIMENT

The growing process of the present invention combines water culture growing techniques with material handling techniques in order to effect increased space productivity and reduced unit cost. Raft means, generally designated 21, carrying plants 22 are floatingly positioned on water culture nutrient solution 23. As shown in FIGS. 1 and 2, raft means 21 is constructed of a buoyant material, such as polystyrene foam, cork, or the like, having six sub-rafts or units 24 interconnected by frangible means 26. Each of sub-rafts 24 carries a plant 22, and it will be understood that the expression "raft means" shall include a single raft or a plurality of sub-rafts which are interconnected.

As best may be seen in FIG. 1, each sub-raft 24 of raft means 21 is formed with an opening 27 therethrough adapted for growth of roots 28 into the nutrient solution. Opening 27 may initially be spanned by frangible membrane 26 for support of a plant seed for germination or may extend through membrane 26 if the plant seed is not germinated on the raft or is germinated on a wick extending through opening 27.

Each of raft means 21 must have sufficient buoyancy and stability for floating support of plants 22. Thus, when six plants 22 are mounted on each raft means, the combined buoyancy of sub-rafts 24 must be capable of support of the plants in a stable condition with roots 28 extending in the nutrient solution and the plant foliage positioned thereabove.

As will be apparent from FIGS. 1 and 2, raft means 21 is constructed in a manner which causes each of plants 22 to be spatially fixed relative to the remaining plants. If the lateral area relative to plant stem 29 were not to increase substantially during growth and maturity of the plants, the fixed spatial relation between the plants would not be of serious consequence. The growth of plants which have the majority of their increase in bulk in the vertical direction, such as grasses, carrots, green onions, etc., can be conveniently grown in soil or through water culture with each plant in fixed lateral relationship to each other plant. When the plant expandes or increases in bulk laterally of the stem from seedling stages to mature plant stages, a fixed spatial relationship between the plants can be tolerated for a long period of time only if the distance between plants is sufficient for the mature plant. Thus, crops such as lettuce, cabbage, spinach, many flowers, etc., must have room to expand during growth.

Raft means 21 as shown in FIGS. 1 and 2, therefore, is constructed of a size designed primarily for germination and growth of the plants 22 during seedling stages until the foliage or roots of the adjacent plants reach a lateral development at which they begin to interfere with the foliage or roots of other plants. In FIG. 1 the progression of lateral development is shown in dotted lines from the earliest seedling stage to the stage at which the plants are beginning to interfere with the growth of each other.

In order to avoid the necessity of having to initially position plants 22 at relatively spaced distances which will accomodate full plant growth in the mature stages, the process of the present invention employs a plurality of separate raft means 21 which are positioned on nutrient solutions 23 in close proximity for maximum plant density per unit area of the nutrient solution. The raft means, however, provide lateral mobility for the plants, unlike a soil medium, and enable the plants to be laterally separated during growth. Thus, each of raft means 21 in FIGS. 1 and 2 can be severed into six sub-rafts at the frangible connections 26 when the plants reach a stage at which they are contacting each other. Once severed, the sub-rafts 24 are free to move laterally as the plants grow. In order to accommodate this lateral movement, of course, the total effective area of nutrient solution 23 must be increased. The manner of increasing the total effective area of the nutrient solution will be described in more detail hereinafter. Raft means 21, therefore, can initially be formed to carry a multiplicity of seedling plants in order to enable a convenient handling of the plants, and subsequently, upon growth of the plants to a stage at which they are contacting adjacent plants, the sub-rafts 24 can be severed from each other to allow lateral expansion of the plant during growth.

The plants are maintained on the nutrient solution in as high density as can be attained, which density is determined by the larger of the lateral area of raft units 24 and the lateral area of plants 22. In the initial growth stages of the seedling, the size of raft units 24 determines the spatial density. Once the plant grows laterally from stem 29 a distance greater than the lateral area of units 24, the plant density is determined by the lateral area of the plants. This latter condition is preferred for maximum space productivity. As growth increases, each raft 24 can be laterally displaced and the nutrient solution effective area increased so that during substantially the entire growth cycle the area of nutrient solution will not be substantially greater than and correspond to the lateral area of the plant.

The productivity of each square foot of space can, therefore, be greatly increased over the productivity of such space when conventional farming techniques are employed by the use of a water culture growing system which employs a plurality of rafts and enables lateral mobility between the plants in a manner corresponding to and determined by plant growth.

For most plants it is preferable not to form raft means 21 of a size which will enable each of the sub-units 24 to support the plant from the seedling to the mature stage. Such a construction would require raft means 21 to have a size and buoyancy which initially was undesirably large. As the plants grow and expand they gain weight which requires increased buoyancy and each of sub-rafts 24 becomes less stable as the lateral area of the plant expands. Therefore, it is preferable that the raft means 21 of FIGS. 1 and 2 merely be employed for seed germination and growth of the plant through the early seedling stages. After the plant has become large enough so as to begin to affect the growth of the adjacent plants, rafts 24 can be severed from each other, and the buoyancy and stability of each of sub-rafts 24 can be increased. This step of increasing the buoyance of the raft means is preferably accomplished by placing raft means 24 on an auxiliary raft means 31 adapted to receive the sub-raft. This step is referred to herein as "transrafting" and best may be seen in FIG. 3. The transrafting is far more efficient and less costly than is the transplanting.

As will be seen, each of auxiliary rafts 31 is formed with a centrally disposed opening 32 through which root system 28 of the plant may pass. In order to secure raft means 24 to auxiliary raft 31, it is preferable that a notch or recess 33 be formed proximate opening 32 for general alignment of opening 27 with opening 32. Notch or recess 33 can have parallel side walls or be tapered, and it is preferable that it substantially conform to the shape of raft 24. If raft 24 is circular or of other polygonal shape, notch 33 can be correspondingly shaped.

The lateral displacement of adjacent raft means to accommodate growth of the plants can be clearly seen in FIG. 3. The plants 22 are shown in solid lines at a stage at which they have a lateral area less than the lateral area of rafts 31. In this condition, the maximum density of plants per unit area of nutrient solution is determined by the maximum density to which rafts 31 can be placed in side-by-side, abutting relation. For the sake of clarity in the drawing only two rafts are shown, but it will be understood that in the process of the present invention substantially the entire top surface of nutrient solution 23 would have rafts placed thereon to maximize plant density for maximum space productivity.

As the plant grows to the size shown by broken lines, rafts 31 will be downwardly displaced in the water under the increased weight of the plants. Additionally, at least one or both of rafts 31 will be laterally displaced. Thus, as will be seen in FIG. 3, the raft on the left has been displaced to the left and downwardly, while the raft on the right has merely been downwardly displaced. The net effect, however, is to laterally displace the rafts as the plants grow laterally. The mature plants 22 can be seen in broken lines to be touching at their peripheries, and in this condition, the maximum density of packing on nutrient solution 23 is determined by the lateral area required for the plants during growth.

Since rafts 31 are initially placed in substantially abutting relation in the nutrient solution to maximize density, the effective area of the nutrient solution must be increased once plants 22 grow beyond the outer periphery of rafts 31. This can be done by increasing the area of the nutrient solution, as for example by placing the rafts in a larger water culture tank.

At some point plants 22 may increase in size to a sufficient degree so as to require the addition of further buoyancy to the auxiliary raft means 31. This can be easily accomplished by placing raft 31 in still a larger auxiliary raft means formed for receipt of the same. Similarly, plants 22 may extend beyond the periphery of raft means 31 to a degree tending to cause the raft means to become top heavy and unstable. Plants 22, however, will tend to provide mutual support once they grow beyond the periphery of raft 31. It is possible, however, to further stabilize or add stability to the individual raft means by interconnecting rafts for mutual support or adding auxiliary floatation having a greater lateral area.

The process for growing plants of the present invention is particularly well suited for the growth of lettuce, and particularly head lettuce, often known as iceburg lettuce. FIGS. 4 and 5 show a schematic diagram and tank layout which can be advantageously used in the growth of lettuce in accordance with the process of the present invention. The series of processing steps performed at the various stations are indicated by the reference letter P while the various tanks employed are indicated by the reference letter T.

The first processing step is usually the placing of seeds on a raft means such as a multi-unit raft 21 for the purpose of germination. The seeds can be placed on a porous membrane, such as a frangible cheesecloth layer 26, extending between units 24 and across openings 27 in a manner similar to U.S. Pat. No. 2,175,113, or the seeds can be placed on wicks which are draped into openings 27 so as to cause the nutrient solution to reach the seeds by capillary action. It is not necessary, however, that the seeds be germinated on the raft means. It would be possible to germinate the seeds on racks or trays and then transplant seedlings to the raft means. At the P-1 processing stage, however, it is preferable that seeds be placed on raft means, and the raft means placed in tank T-1 so as to substantially cover the entire top surface of the tank for germination. Sicne the seeds have virtually no lateral area, the rafts will undoubtedly determine the maximum density of seedlings achievable for the area of tank T-1.

Once the seeds have germinated and are in their seedling stage, they are inspected and transferred at processing station P-2 to tank T-2. Although in the early seedling stages the plants will not be larger than the rafts, tank T-2 is larger than tank T-1 since germination requires less time than is required for growth in the seedling stages in tank T-2. Accordingly, a small tank T-1 can germinate seeds at a sufficient rate to require larger tank T-2.

A second seedling tank T-3 is preferably provided in which the more mature and vigorous seedlings in tank T-2 can be inspected and segregated and placed in tank T-3. Since this inspection and segregation is similar to that of processing at station P-2, it is designated as processing step P-2'. The advantage of having two seedling tanks T-2 and T-3 is that nutrient solutions, lighting conditions, etc., can be varied to correspond to the growth of the plant and to minimize the cost of lighting and nutrients.

At station P-3, the plants are again inspected and transferred to tank T-4 for the first substantial growth stage. Depending upon the size of the rafts on which the seeds were germinated, processing step P-3, can also include transrafting the seedlings to larger auxiliary raft means. Thus, the subunits 24 of raft means 21 can be separated and placed on larger auxiliary rafts 31. To some extent prior processing steps may have resulted in separation of more rapidly growing seedlings from the slower growing seedlings.

As will be noted from FIG. 5, tank T-4 is substantially larger than tank T-3. This increased size is required to accommodate the lateral growth of the plants, and tank T-4 may also be deeper to accommodate longer roots. The rafts are again placed in tank T-4 so that either the plants or the rafts substantially cover the top surface of tank T-4.

Processing station P-4 can again be the site for inspection and transrafting of plants to tank T-5 for intermediate growth. In addition, however, processing station P-4 preferably includes a recycling function at which plant processing steps are performed. Thus, tank T-4 can be provided with a recycling trough or channel 41 having an entry 42 at one end of tank T-4 and a discharge 43 at an opposite end of tank T-4. Trough 41 is preferably connected to tank T-4 for the flow of nutrient fluids therebetween. Rafts in tank T-4 can be urged into trough 41 through entryway 42, at which point they are inspected. If they are ready for the intermediate growth stages, they are transferred to tank T-5. If the plants need to be recycled, the raft means are urged over the nutrient solution in trough 41 down the trough past the various plant processing devices. As is diagrammatically indicated in FIG. 5, these devices include plant fumigating means 46, plant lighting means 47, and air circulation means 48. The support of the plants on rafts, therefore, enables the rafts to be employed as a vehicle to facilitate processing of the plants. The nutrient solution in trough 41 therefore acts as a transport as well as a growing medium. Moreover, the nutrient solution in tank T-4 acts as a transport medium for movement of the raft means from processing station P-3 and discharge 43 of trough 41 to entry 42 to the processing station P-4.

The means for urging rafts over the nutrient solution can, for example, include such devices as mechanical wiper-like blades, which move the rafts in tank T-4 and in trough 41, circulating pumps with intakes and their discharge directed in a manner causing circulation of the nutrient solution in the desired direction, and air discharge onto the plants to cause them to act as sails.

The rate of movement of the plants over the nutrient solution can be regulated so as to interrelate with the processing steps performed. In order to reduce the cost of growing the plants, for example, it may be highly desirable to provide artificial lighting during only a portion of the growing cycle. Thus, instead of lighting the entire tank T-4, the plants may be exposed to light only when passing in front of light means 47 over a trough 41. The amount of lighting which each plant receives is dependent upon the rate at which the plants are urged past light means 47 as well as the intensity of the lighting and the length of the path over which the plants are lighted. Accordingly, the processing steps can depend in part upon movement of the plants over the nutrient solution and the rate of such movement. The same is true of steps such as fumigation, nutrient pasteurization, infrared irradiation, $CO_2$ atmosphere control, and temperature change.

It should also be noted that the rate of transport along trough 41 can be varied to control the growth, "production," of plants in accordance with demand. Thus, transport rates over the nutrient solution can be varied to regulate the exposure to light, air, $CO_2$, etc., to speed growth for high market demand or retard growth when demand decreases.

Once the plants are in tank T-5, they have reached an intermediate growing stage. Most of the plants will have been transrafted to place the smaller raft on a larger raft, which increases either the stability or the buoyance of the raft means, or both, to accommodate growth through the intermediate stages. The nutrient solution in tank T-5 can again be used as a transport medium for conveyance of the plants from the position of entry to station P-6. Again, station P-6 can include a recycling trough 51 for recycling of plants and rafts in a direction of arrow 52, with the recycling causing the plants to move past various processing stations (not shown). At station P-5 plants are again inspected and, when mature, transferred for their final maturing growth to tank T-6. If not mature, the plants are recycled in trough 51 so that their time in intermediate growth tank T-5 is prolonged until they are ready for transfer. Station P-5 can include further transrafting or placing of raft means on larger or auxiliary raft means to increase the raft means and/or stability. Again, the size of tanks T-5 and T-6 preferably is increased to reflect the increasing size of the plants as they mature in the various tanks.

Once in tank T-6, the plants undergo their final growth and are inspected and harvested at processing station P-6. Recycling processing trough 53 may be provided for processing while in tank T-6 with the flow of rafts being in the direction of arrow 54 past lighting stations, etc. (not shown).

Finally, it should be noted that an advantage of the present invention which accrues from providing the plants with lateral mobility by employing raft means and further from substantially covering the top surface of the nutrient solution with either raft means or the plants, whichever is larger, is that the cover provided by the raft means and/or plants allows better control of the nutrient solution. Thus, the temperature can be more easily maintained, and the growth of algae or the like can be controlled, since the plants or rafts block the passage of light into the nutrient solution. Additionally, it is advantageous to use a plurality of tanks in order that temperature conditions and the nutrient constituents can be varied in a manner corresponding to the plants' development for maximum efficiency of growth and minimum cost.

What is claimed is:

1. A process for growing plants, which plants require a substantial lateral area relative to the plant stem for growth during mature plant stages and relatively insubstantial lateral area during seedling plant stages, comprising the steps of:

floating a plurality of plants by means of a plurality of separate raft means on a nutrient solution, each said raft means having sufficient buoyancy and stability for floating support of said plants and being adapted for communication of nutrient solution to said plants for growing of the same, said floating step including positioning of said plurality of raft means in said nutrient solution in close proximity to each other for substantially maximum plant density per unit area of nutrient solution as determined by the larger of the lateral area of said raft means and the lateral area of said plants; and laterally displacing said raft means and said plants while increasing the total effective area of said nutrient solution in an amount corresponding to the increase of the lateral area required by said plants during growth while maintaining substantially maximum plant density per unit area of nutrient solution.

2. A process for growing plants as defined in claim 1 wherein, each said raft means is initially formed with a buoyancy and stability accomodating growth of the plant supported thereon through a substantial portion of its growth cycle, and the step of increasing at least one of the buoyancy and the stability of said raft means in sufficient amount to accommodate further growth of said plant through a substantial portion of its growth cycle.

3. A process for growing plants as defined in claim 2 wherein, said step of increasing the buoyancy and maintaining the stability of said raft means is accomplished by placing each said raft means in an auxiliary raft means adapted to receive said raft means.

4. A process for growing plants as defined in claim 1 wherein, seeds for said plants are placed on said raft means for germination.

5. A process for growing plants as defined in claim 1 wherein, said raft means are each formed with an area laterally of the stem of the plant not substantially greater than the lateral area of said plant.

6. A process for growing plants as defined in claim 1 wherein, said plants are lettuce.

7. A process for growing plants as defined in claim 6 wherein, said lettuce is head lettuce.

8. A process for growing plants as defined in claim 1, and the step of:

maintaining the positioning of said plurality of raft means in said nutrient solution in such close proximity that at least one of said plurality of raft means and said plurality of plants substantially covers the top surface of said nutrient solution to assist in the control of growing conditions for said plants.

9. A process for growing plants comprising the steps of:

floating a plurality of plants by means of a plurality of raft means on a nutrient solution for growth of the said plants, said nutrient solution being contained in tank means having a plurality of processing stations at which processing steps are performed; and urging said raft means over said nutrient solution from one of said processing stations to at least one other of said processing stations whereby said nutrient solution acts as a transport as well as growing medium and periodically increasing at least one of the buoyance and stability of said raft means at one of said processing stations.

10. A process for growing plants comprising:

a. placing a plant to be grown on raft means having sufficient buoyancy and stability for floating support of said plant on a nutrient solution, said raft means being adapted for communication of nutrient solution to said plant for growth thereof;

b. placing said raft means with said plant thereon on said nutrient solution for growth of said plant; and c. after a period of growth of said plant, connecting said raft means with said plant thereon with auxiliary raft means adapted to provide at least one of additional buoyancy and additional stability for floating support of said plant and adapted for communication of said nutrient solution to said plant.

11. A process for growing plants as defined in claim 10 wherein, a plurality of said raft means each carrying a plant thereon are provided, said plurality of raft means being interconnected by frangible means, and the step of:

disconnecting said plurality of raft means at said frangible means prior to said step of connecting said raft means to said auxiliary raft means.

* * * * *

UNITED STATES PATENT OFFICE
CERTIFICATE OF CORRECTION

PATENT NO. : 3,927,491
DATED : December 23, 1975
INVENTOR(S) : Robert S. Farnsworth It is certified that error appears in the above-identified patent and that said Letters Patent are hereby corrected as shown below:

Column 3, line 66, correct the spelling of "expandes" to ---expands---;

Column 5, line 10, correct the spelling of "buoyance" to ---buoyancy---;

Column 6, line 34, correct the spelling of "Sicne" to ---Since---; and

Column 8, line 1, correct the spelling of "buoyance" to ---buoyancy---.

Signed and Sealed this fifteenth Day of June 1976

[SEAL]

Attest:

RUTH C. MASON
Attesting Officer

C. MARSHALL DANN
Commissioner of Patents and Trademarks